US011620965B2

(12) United States Patent
Ding et al.

(10) Patent No.: US 11,620,965 B2
(45) Date of Patent: Apr. 4, 2023

(54) VIDEO DISPLAY METHOD, VIDEO DISPLAY SYSTEM, ELECTRONIC DEVICE, AND STORAGE MEDIUM

(71) Applicant: Beijing Institute of Technology, Beijing (CN)

(72) Inventors: Gangyi Ding, Beijing (CN); Tianyu Huang, Beijing (CN); Peng Li, Beijing (CN); Lijie Li, Beijing (CN); Mingxiang Tang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 17/406,054

(22) Filed: Aug. 18, 2021

(65) Prior Publication Data

US 2022/0059053 A1 Feb. 24, 2022

(30) Foreign Application Priority Data

Aug. 19, 2020 (CN) ......................... 202010834560.2

(51) Int. Cl.
*G09G 5/32* (2006.01)
*G06F 3/14* (2006.01)
*G09G 5/00* (2006.01)
*G09G 5/395* (2006.01)

(52) U.S. Cl.
CPC ............. *G09G 5/32* (2013.01); *G06F 3/1454* (2013.01); *G09G 5/006* (2013.01); *G09G 5/395* (2013.01); *G09G 2300/026* (2013.01)

(58) Field of Classification Search
CPC .......... G09G 5/32; G09G 5/006; G09G 5/395; G09G 2300/026; G09G 2360/122; G06F 3/1454; G06F 3/1431; A63J 1/00
See application file for complete search history.

(56) References Cited

U.S. PATENT DOCUMENTS

| | | | | |
|---|---|---|---|---|
| 7,876,331 B2 * | 1/2011 | Rackham | ................ | G06T 17/20 345/170 |
| 2015/0279037 A1 * | 10/2015 | Griffin | .................. | G06F 3/1438 345/1.3 |
| 2017/0038928 A1 * | 2/2017 | Park | ....................... | G06V 40/10 |

FOREIGN PATENT DOCUMENTS

CN 203554552 U * 4/2014

* cited by examiner

*Primary Examiner* — Brent D Castiaux
(74) *Attorney, Agent, or Firm* — Loeb & Loeb LLP

(57) ABSTRACT

A video display method includes: acquiring at least one frame image corresponding to a current display time point in at least one source video; reading a stage configuration file, obtaining a stage modeling parameter of the stage space at the current display time point and a corresponding relationship between the at least one frame image and the stage space according to a specific stage related parameter in the stage configuration file; according to the stage modeling parameter and the corresponding relationship, processing the at least one frame image to obtain divided regions corresponding to all display screens included in the at least one stage plane; determining display contents corresponding to the divided regions, and copying the display contents to at least one target memory; and outputting a content in the at least one target memory to the at least one stage plane for display.

15 Claims, 5 Drawing Sheets

VIDEO DISPLAY METHOD, VIDEO DISPLAY SYSTEM, ELECTRONIC DEVICE, AND STORAGE MEDIUM

CROSS-REFERENCE TO RELATED APPLICATION

The present application claims priority of Chinese Patent Application No. 202010834560.2, filed on Aug. 19, 2020, and the entire content disclosed by the Chinese patent application is incorporated herein by reference as part of the present application for all purposes under the U.S. laws.

TECHNICAL FIELD

The embodiments of the present disclosure relate to a video display method, a video display system, an electronic device, and a non-transitory computer-readable storage medium.

BACKGROUND

A stage provides space for performance, and whether a theatrical performance can achieve a desired effect, the stage is the foundation. A modern stage, especially a multimedia dynamic stage, creates more development space for stage art in a limited stage, and provides more changes and choices for directors and stage designers.

The development of the lifting platform is the representative of the development of stage machinery, and the lifting platform is widely used in modern stage technology. From the initial use of lifting platforms in the stage in a small amount, to the large-scale use of lifting platforms in the stage now, the lifting platform has become an important part of the stage from an auxiliary mechanical equipment of the stage. With the increase of the number of lifting platforms, the structure and the use method of the lifting platforms have also changed. Especially in a three-dimensional dynamic multimedia stage, LED (Light-Emitting Diode) display screens which can play the video are installed on the top and sides of the lifting platform. In a lifting process of the lifting platform and the process forming static stage modeling, each surface that has an LED display screen needs to display pictures or videos matching with the program, so the lifting platform becomes a part of the stage background.

SUMMARY

The present disclosure provides a video display method for a general large-scale performance dynamic stage in view of the defects of the prior art. The video display method provides a general and accurate LED screen digital mapping solution irrelevant to the stage for a dynamic stage video background and improves the memory utilization efficiency and the mapping speed.

Further, the present disclosure provides a video display method, which is suitable for a general large-scale performance dynamic stage, is used for displaying a background video of a stage space, and comprises the following steps: according to an overall display effect of the stage, designing one or more source videos as the background of the stage, and decomposing each source video file into a sequence of video frames, so as to obtain a plurality of frame images, which correspond to a plurality of display time points, included in each source video file; for a current display time point of the plurality of display time points: acquiring at least one frame image corresponding to the current display time point in the at least one source video; reading a stage configuration file, and obtaining a stage modeling parameter of the stage space at the current display time point and a corresponding relationship between the at least one frame image and the stage space according to a specific stage related parameter in the stage configuration file; according to the stage modeling parameter and the corresponding relationship between the at least one frame image and the stage space, processing the at least one frame image to obtain a plurality of divided regions that are in one-to-one correspondence to all display screens comprised in the at least one stage plane; determining a plurality of display contents that are in one-to-one correspondence to the plurality of divided regions, and copying the plurality of display contents to at least one target memory; and outputting a content in the at least one target memory to the at least one stage plane for display.

According to an exemplary implementation of the embodiments of the present disclosure, a spatial position and a size of each display screen at the current display time point are obtained based on the stage modeling parameter, the corresponding relationship between the at least one frame image and the stage space comprises a frame image corresponding to each display screen and a corresponding relationship between the at least one source video and the stage space, the corresponding relationship between the at least one source video and the stage space comprises a stage plane corresponding to each of the at least one frame image and a plurality of vertex space coordinates of each frame image in a stage plane corresponding to each frame image after each frame image is mapped to the stage plane corresponding to each frame image. According to the stage modeling parameter and the corresponding relationship between the at least one frame image and the stage space, processing the at least one frame image to obtain the plurality of divided regions that are in one-to-one correspondence to the all display screens comprised in the at least one stage plane, comprises: for each display screen of the all display screens, determining a spatial position and a size of the display screen at the current display time point according to the stage modeling parameter; according to the corresponding relationship between the at least one source video and the stage space, determining a frame image corresponding to the display screen and a plurality of vertex space coordinates of the frame image in a stage plane corresponding to the frame image after the frame image is mapped to the stage plane corresponding to the frame image; and determining a divided region corresponding to the display screen based on the spatial position and the size of the display screen at the current display time point and the plurality of vertex coordinates of the frame image in the stage plane corresponding to the frame image.

According to an exemplary implementation of the embodiments of the present disclosure, before determining the plurality of display contents that are in one-to-one correspondence to the plurality of divided regions, the video display method further comprises: reading the at least one frame image into a source memory.

According to an exemplary implementation of the embodiments of the present disclosure, determining the plurality of display contents that are in one-to-one correspondence to the plurality of divided regions, comprises: for each divided region of the plurality of divided regions, determining a source memory address space corresponding to the divided region in the source memory; and arranging contents in the source memory address space according to a display screen pixel arrangement sequence, to obtain a display content corresponding to the divided region.

According to an exemplary implementation of the embodiments of the present disclosure, determining the source memory address space corresponding to the divided region in the source memory, comprises: acquiring an offset value of each pixel in the divided region relative to an image origin corresponding to the divided region; determining a source memory address corresponding to the image origin; according to the source memory address corresponding to the image origin and the offset value, determining a source memory address corresponding to each pixel; and according to source memory addresses corresponding to all pixels in the divided region, determining the source memory address space corresponding to the divided region.

According to an exemplary implementation of the embodiments of the present disclosure, determining the plurality of display contents that are in one-to-one correspondence to the plurality of divided regions, comprises: for each divided region of the plurality of divided regions: determining a source memory address space corresponding to the divided region; acquiring an image editing parameter, and performing a transformation process on contents in the source memory address space corresponding to the divided region according to the image editing parameter; and arranging the contents in the source memory address space after being performed the transformation process according to a display screen pixel arrangement sequence, to obtain a display content corresponding to the divided region.

According to an exemplary implementation of the embodiments of the present disclosure, the all display screens are divided into at least one display screen group according to positions of the all display screens, at least one divided region corresponding to at least one display screen comprised in each display screen group constitutes a divided region group, and each divided region group corresponds to a target memory of the at least one target memory, each divided region group corresponds to a display screen arrangement sequence, the display screen arrangement sequence is used for indicating an arrangement sequence of at least one display content corresponding to the at least one divided region comprised in each divided region group in a target memory corresponding to each divided region group. Copying the plurality of display contents to at least one target memory, comprises: for an i-th divided region group, according to a display screen arrangement sequence corresponding to the i-th divided region group, copying at least one display content corresponding to at least one divided region comprised in the i-th divided region group to a target memory corresponding to the i-th divided region group. i is a positive integer and less than the total number of the at least one divided region group.

According to an exemplary implementation of the embodiments of the present disclosure, each display screen group is controlled by a display controller, the video display method further comprises: for the plurality of divided regions, taking a divided region group as a unit, sequentially performing operations of determining at least one display content corresponding to at least one divided region comprised in the divided region group, and copying the at least one display content to a target memory corresponding to the divided region group, and releasing the target memory corresponding to the divided region group in response to a case where a content of the target memory corresponding to the divided region group is output to a corresponding display controller.

According to an exemplary implementation of the embodiments of the present disclosure, the all display screens are divided into at least one display screen group according to positions of the all display screens, and at least one divided region corresponding to at least one display screen comprised in each display screen group constitutes a divided region group, the at least one target memory comprises a common target memory, and at least one divided region group corresponding to the at least one display screen group shares the common target memory. Determining the plurality of display contents that are in one-to-one correspondence to the plurality of divided regions, and copying the plurality of display contents to at least one target memory, comprises: for an i-th divided region group, according to m spatial positions of m display screens corresponding to m divided regions comprised in the i-th divided region group, determining whether the m display screens are all shielded, in response to a case where the m display screens are all shielded, taking a content currently stored in the common target memory as m display contents corresponding to the m divided regions, and not executing a writing operation to the common target memory; in response to a case where at least one display screen of the m display screens is not shielded, determining m display contents corresponding to the m divided regions, and writing the m display contents into the common target memory. i is a positive integer and less than the total number of the at least one divided region group, and m is a positive integer.

According to an exemplary implementation of the embodiments of the present disclosure, the all display screens are divided into at least one display screen group according to positions of the all display screens, each display screen group is controlled by a display controller, and each display screen group corresponds to a target memory and a display screen arrangement sequence. Outputting the content in the at least one target memory to the at least one stage plane for display, comprises: for each target memory of the at least one target memory: outputting a content in the target memory to a display controller controlling a display screen group corresponding to the target memory; processing the content in the target memory by the display controller according to a display screen arrangement sequence corresponding to the display screen group, to obtain a plurality of display contents stored in the target memory; outputting the plurality of display contents stored in the target memory by the display controller to corresponding display screens in the at least one stage plane for display.

According to an exemplary implementation of the embodiments of the present disclosure, the all display screens are divided into at least one display screen group according to positions of the all display screens, each display screen group is controlled by a display controller, each display screen group corresponds to a target memory and a display screen arrangement sequence, each display screen group corresponds to a stage screen control video file. Outputting the content in the at least one target memory to the at least one stage plane for display, comprises: for each display screen group of the at least one display screen group, storing a content in a target memory corresponding to the display screen group, to generate a stage screen control video file corresponding to the display screen group; in response to displaying the background video, outputting at least one stage screen control video file corresponding to the at least one display screen group to the at least one display controller for display.

According to an exemplary implementation of the embodiments of the present disclosure, the stage screen control video file corresponding to the display screen group comprises a content in a target memory corresponding to each of the plurality of display time points, and contents in target memories corresponding to the plurality of display time points are sequentially stored in the stage screen control video file corresponding to the display screen group according to a time relationship.

The present disclosure also provides a video display system for displaying a background video of a stage space, the stage space comprises at least one stage plane, each of the at least one stage plane comprises a plurality of display screens, the background video comprises at least one source video, each source video comprises a plurality of frame images corresponding to a plurality of display time points, respectively, and each source video is displayed on a stage plane, the video display system comprises a stage-independent display processing unit, a source memory, at least one target memory, and at least one display controller, the source memory is configured to store at least one frame image, which corresponds to a current display time point of the plurality of display time points, in the at least one source video; the stage-independent display processing unit is configured to: reading a stage configuration file, and obtaining a stage modeling parameter of the stage space at the current display time point and a corresponding relationship between the at least one frame image and the stage space according to a specific stage related parameter in the stage configuration file, according to the stage modeling parameter and the corresponding relationship between the at least one frame image and the stage space, processing the at least one frame image to obtain a plurality of divided regions that are in one-to-one correspondence to all display screens comprised in the at least one stage plane, determining a plurality of display contents that are in one-to-one correspondence to the plurality of divided regions, and copying the plurality of display contents to at least one target memory, outputting a content of the at least one target memory to the at least one stage plane for display; the at least one target memory is configured to store display contents of the all display screens, the at least one display controller is configured to control a corresponding display screen to display a display content to be displayed through a signal line according to the content in the at least one target memory.

In the video display system provided by the present disclosure, the all display screens are divided into at least one display screen group according to positions of the all display screens, each display screen group is controlled by a display controller, and each display screen group corresponds to a target memory and a display screen arrangement sequence, each display screen group corresponds to a stage screen control video file, in a case where the stage-independent display processing unit performs an operation of outputting the content in the at least one target memory to the at least one stage plane for display, the operation comprises following steps: for each display screen group of the at least one display screen group, storing a content in a target memory corresponding to the display screen group, to generate a stage screen control video file corresponding to the display screen group, wherein the stage screen control video file corresponding to the display screen group comprises a content in a target memory corresponding to each of the plurality of display time points, and contents in target memories corresponding to the plurality of display time points are sequentially stored in the stage screen control video file corresponding to the display screen group according to a time relationship; in response to displaying the background video, outputting at least one stage screen control video file corresponding to the at least one display screen group to the at least one display controller for display.

On the other hand, the present disclosure also provides an electronic device, and the electronic device comprises: at least one processor; and a memory communicatively connected with the at least one processor. The memory stores instructions executable by the at least one processor, and the instructions are executed by the at least one processor to make the at least one processor to execute the video display method according to any one of the above embodiments.

On the other hand, the present disclosure also provides a non-transitory computer-readable storage medium, the non-transitory computer-readable storage medium stores computer instructions, and the computer instructions are used for making a computer execute the video display method according to any one of the above embodiments.

Beneficial Effects

The video display method provided by the present disclosure is suitable for a general large-scale performance dynamic stage, and the video display method provides a general LED screen video background digital mapping solution irrelevant to the stage for a dynamic stage modeling. While achieving an accurate stage modeling background, the versatility of the method is improved, the hardware complexity of dynamic stage management is reduced, and the memory utilization efficiency and the mapping speed are improved.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

The embodiments of the present disclosure will be described in detail with reference to the accompanying drawings.

In the three-dimensional dynamic multimedia stage used in a large-scale performance, LED display screens that can play videos are installed on the top and sides of the lifting platform. In a lifting process of the lifting platform and the process forming static stage modeling, each surface that has an LED display screen needs to display a picture or video matching with the program, so the lifting platform becomes a part of the stage background. For the dynamic stage used in a large-scale performance, the present disclosure provides a video display method for controlling the display content of the LED display screens.

In a large-scale performance, a large number of LED display screens are installed on the stage modules, and a stage often contains thousands of display screens with various sizes. If the display content is designed separately for each display screen, huge manpower and material resources will undoubtedly be consumed, the design difficulty of the stage designer is increased, and it is difficult to guarantee the final composite effect of all display screens.

In a large-scale performance, there are many technical problems that need to be solved urgently, for example, how to manage the editing and output of the video file so that all screens can cooperate with each other and accurately display each video, how to reduce the hardware complexity of LED display screen management, and how to effectively manage the digital video mapping memory of display screens and reduce the time required for digital mapping, etc.

When performing video display mapping on the dynamic stage in a large-scale performance, another technical problem is that the video display mapping process varies from stage to stage, that is, a separate software tool needs to be developed for each different stage modeling. If the video display mapping process may be summarized and analyzed, the common processing process may be extracted, and the parts related to the specific stage may be stripped and written into a configuration file, which can greatly improve the universality and reusability of video processing and display software tools. These contents have not been recorded in the prior art.

Figure 1:
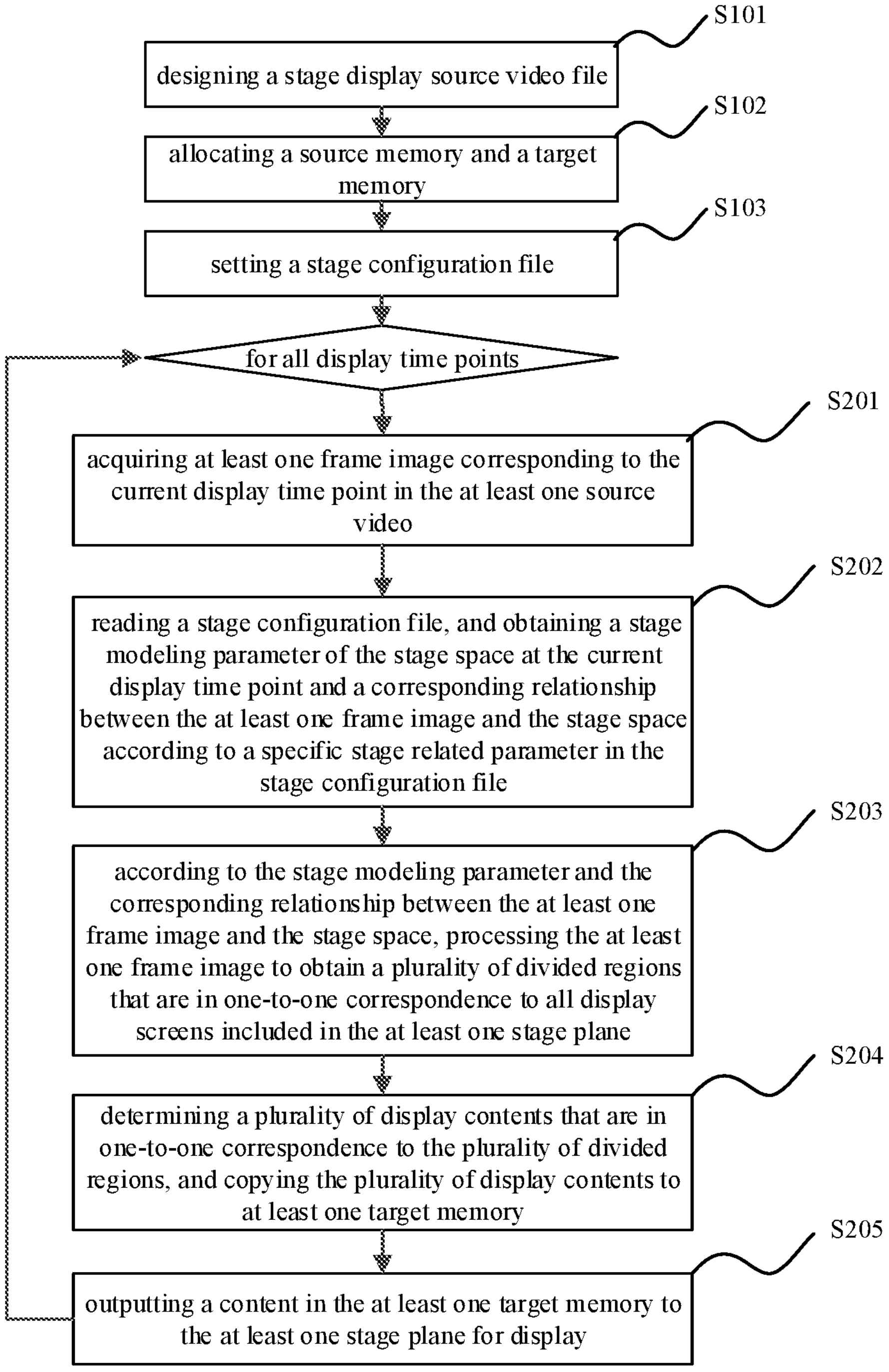
FIG. 1 is a flowchart of a video display method provided by at least one embodiment of the present disclosure.

FIG. 1 is a flow chart of a video display method for a general large-scale performance dynamic stage according to an embodiment of the present disclosure.

Figure 2:
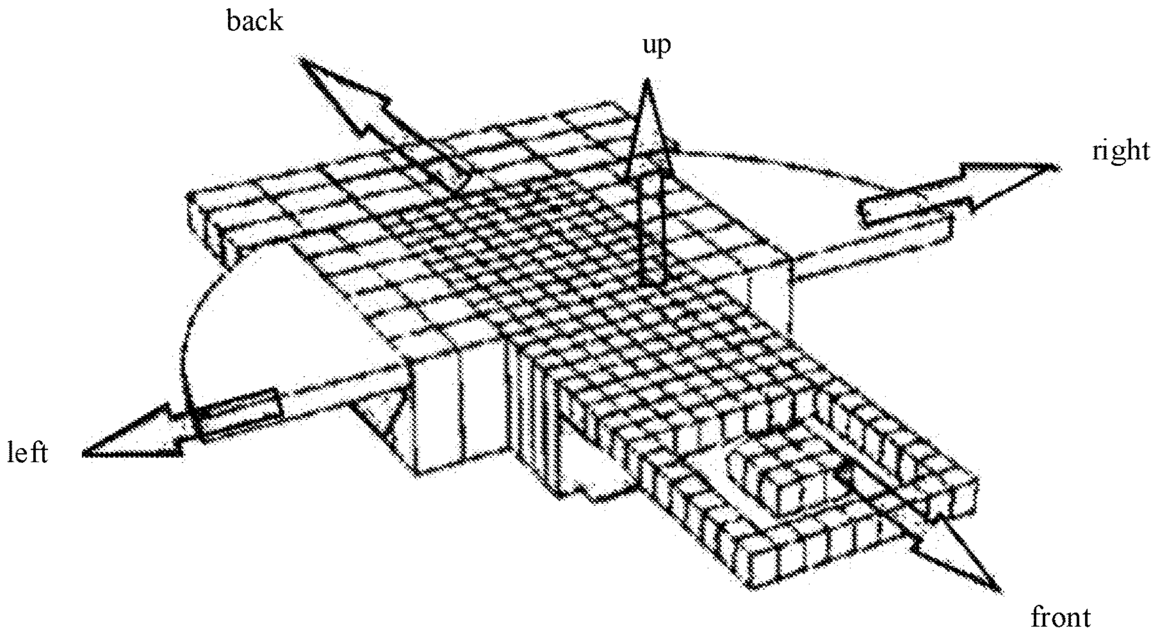
FIG. 2 is a schematic diagram of a first dynamic stage.
Figure 3:
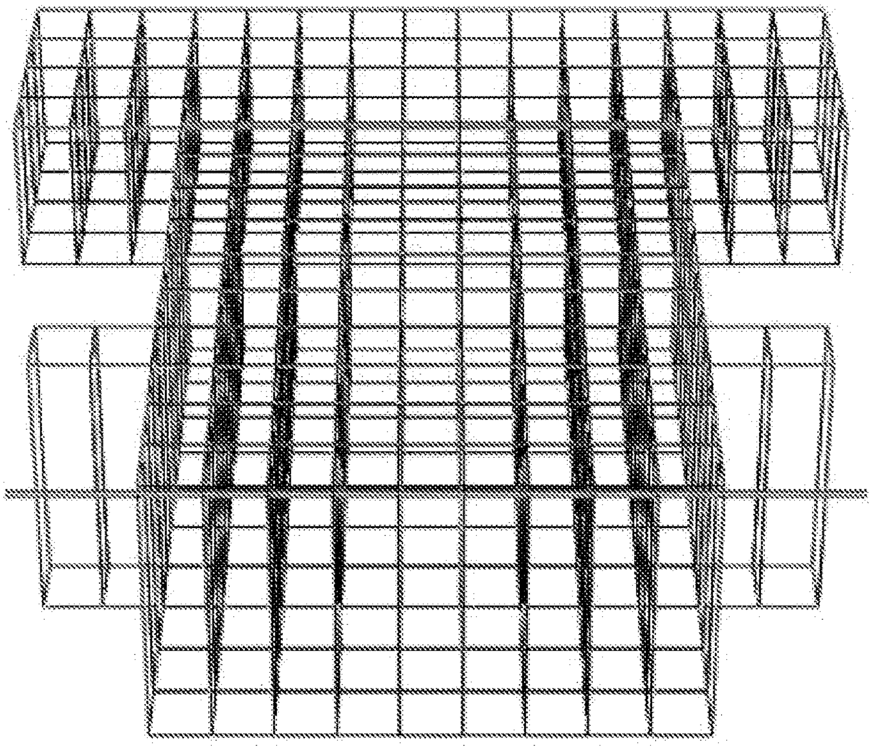
FIG. 3 is a schematic diagram of a second dynamic stage.

FIG. 2 and FIG. 3 are schematic diagrams of dynamic stages, respectively.

As shown in FIG. 2, the dynamic stage for a large-scale performance is composed of a plurality of stage modules, the stage module may be a cube, a cuboid, or a special-shaped stage module. Each stage module is connected with a slide rail, and the stage module is controlled to move forward and backward, or left and right, or up and down by the mechanical slide rail. By controlling the movement of the stage modules, different stage modeling may be formed.

In the stage shown in FIG. 3, the top and sides of each stage module are equipped with LED display screens that can play videos. Similar to the output way of the display card control display, in order to control the display of LED display screens, each LED display screen is connected with a display controller through a signal line, and the broadcast controller controls a display content of each LED display screen by outputting display signal(s) to the display controller.

Because the dynamic stage contains a plurality of stage modules, the output contents of all stage modules cooperates to form the overall background of the stage. In a large-scale performance, a large number of LED display screens are installed on the stage modules, a stage often contains thousands of display screens with various sizes. If the display content is designed separately for each display screen, huge manpower and material resources will undoubtedly be consumed, the design difficulty of the stage designer is increased, and it is also difficult to guarantee the final composite effect of all display screens.

In order to solve the above technical problems, at least one embodiment of the present disclosure provides a video display method, and the video display method, for a current display time point of the plurality of display time points, includes: acquiring at least one frame image corresponding to the current display time point in the at least one source video; reading a stage configuration file, and obtaining a stage modeling parameter of the stage space at the current display time point and a corresponding relationship between the at least one frame image and the stage space according to a specific stage related parameter in the stage configuration file; according to the stage modeling parameter and the corresponding relationship between the at least one frame image and the stage space, processing the at least one frame image to obtain a plurality of divided regions that are in one-to-one correspondence to all display screens included in the at least one stage plane; determining a plurality of display contents that are in one-to-one correspondence to the plurality of divided regions, and copying the plurality of display contents to at least one target memory; and outputting a content in the at least one target memory to the at least one stage plane for display.

The video display method provided by at least one embodiment of the present disclosure will be described in detail with reference to the accompanying drawings.

For example, the video display method is used for displaying a background video of a stage space, for example, the stage space is the afore-mentioned dynamic stage.

As shown in FIG. 1, the video display method provided by at least one embodiment of the present disclosure includes the following steps S101-S103 and S201-S205.

In step S101, designing a stage display source video file. According to the overall display effect of the stage, one or more source video files are designed as the stage background, and each source video file is decomposed into a sequence of video frames.

According to the video display method provided by the embodiment, the stage designer does not need to design the display content separately for each display screen, but regards the stage modeling composed of all stage modules as a whole, and designs the stage background according to the overall display effect of the stage. For example, if all the stage modules form a flat large screen, the designer only needs to design a video file to be displayed on this large screen. Different videos may be displayed on different positions of a complex stage, such as a sky video is displayed on a top three-dimensional stage, a forest video is displayed on a ground three-dimensional stage, etc., so the designer needs to produce a plurality of source videos for the stage.

For example, the stage space includes at least one stage plane, and each stage plane includes a plurality of display screens. The stage space shown in FIG. 3 is composed of cube stage modules, that is, the display screens installed on the top and sides of the stage module may have five orientations, namely, up, left, right, front, and back, and the display contents displayed on the display screens facing the same orientation are combined into a stage background of the orientation. For example, the stage space shown in FIG. 3 includes five stage planes, and the display screens facing the same orientation in all stage modules constitute a stage plane. For example, the display screens facing up in all stage modules constitute a stage plane facing up, and the display screens facing left in all stage modules constitute a stage plane facing left. Audiences at different positions of the stage may see different stage backgrounds composed of different display screens. Therefore, the designer needs to design different source videos for the stage planes facing different orientations, that is, the background video of the stage space includes a plurality of source videos, and each source video is displayed on a stage plane. For example, five source videos are designed for the stage as shown in FIG. 3, and the five source videos are displayed on five stage planes, respectively. For a complex stage modeling, for example, a plurality of three-dimensional dynamic stages as shown in FIG. 3 are arranged in the stage space, so it is necessary to design five source videos for each three-dimensional dynamic stage.

For the stage designer, he/she doesn't need to care about how the display screens of the stage modules are designed and installed, only needs to know the stage modeling at a specific time point and designs the source video as the whole background of the stage.

After the designer designs the source video file, the technician needs to display the video file as the background on the complex dynamic stage. Each source video includes a plurality of frame images corresponding to a plurality of display time points, respectively. Video mapping is reflected as the image mapping at each specific time point, in order to perform the video mapping, it is necessary to decompose each source video file into a sequence of video frames, so as to obtain one or more frame images corresponding to each display time point.

For example, a frame image is displayed on a stage plane, that is, a plurality of display screens constituting the stage plane are used for displaying the frame image.

In step S102, allocating a source memory and a target memory. For example, the source memory is allocated for the frame image and the target memory is allocated for display screen.

For example, before performing the image mapping, it is necessary to allocate the source memory for the frame image and the target memory for the display screen, so as to be used in the subsequent process.

In step S103, setting a stage configuration file, and writing a specific stage related parameter into the stage configuration file.

The present disclosure provides a universal method irrelevant to the stage, that is, the method itself is irrelevant to the stage, the method only provides an interface with a specific stage, obtains the specific stage related parameter through the interface, and achieves video processing mapping of the specific stage. Because there are many specific related stage parameters, the interface is implemented by means of a configuration file, and the specific stage related parameters are written into the stage configuration file.

For example, a display time interval may be set for the display screen, that is, the image displayed on the display screen is switched once every display time interval, and the time point when the image displayed on the display screen is switched is the display time point. Setting the display time interval corresponding to the display screen, and performing the following operations for each display time point, that is, performing steps S201-S205.

In step S201, acquiring at least one frame image corresponding to the current display time point in the at least one source video. The at least one frame image is in one-to-one correspondence to the at least one source video, that is, a frame image corresponding to the current display time is acquired from each source video.

For example, all frame images (that is, the at least one frame image corresponding to the current display time point) at the time point (that is, the current display time point) are read into the source memory.

At step S202, reading a stage configuration file, and obtaining a stage modeling parameter of the stage space at the current display time point and a corresponding relationship between the at least one frame image and the stage space according to a specific stage related parameter in the stage configuration file.

After obtaining the frame image as the whole background of the stage, the stage technician needs to accurately map the source image (that is, the frame image) to each LED display screen of the stage module, that is, accurately map the part of the source image corresponding to each LED display screen to the LED display screen, so as to display the part. In order to map accurately, it is necessary to obtain the specific stage modeling first. Because each stage module in the dynamic stage moves with time, at the specific moment when the mapping the performed, it is necessary to obtain parameters such as a spatial position and a size of each display screen at the current display time point.

For example, the spatial position, orientation, and size of each display screen installed on the stage module may be obtained according to the position, shape, and size of each stage module. However, the relevant data of the stage module or display screen is closely related to the display effect of the stage, so the relevant data may be set in advance by the technician and written into the stage configuration file. In a case where the video display method provided by the present disclosure is executed, the stage modeling parameter related to the specific stage is read from the stage configuration file, and the spatial position, size, and other data of each display screen at various display time points are obtained based on the stage modeling parameter.

According to an exemplary implementation of the embodiment of the present disclosure, the stage configuration file may include the stage module parameters, and the stage module parameters include three-dimensional position coordinates of the stage module, the size of the stage module, the resolution of display screens on six surfaces of the stage module (i.e., a top surface, a bottom surface, a left surface, a right surface, a front surface, and a back surface), etc. If a certain surface of the stage module is not equipped with a display screen, the resolution of the display screen may be set to 0, and relevant data of the display screen may be obtained based on the stage module parameters. In addition, the stage configuration file may also include video configuration parameters. For example, the video configuration parameters may include the corresponding relationship between the frame images and the stage space. For example, the corresponding relationship may include the frame image corresponding to each display screen and the corresponding relationship between the source video(s) and the stage space. In addition, the video configuration parameters may also include the path of the source video file and path of the stage screen control video file described later, the resolution of the source video, etc.

Step S202 is a step in which the universal method interacts with the stage configuration file containing the specific stage related parameter. In this step, the video display method provided by the present disclosure includes: reading the stage configuration file, and obtaining the stage modeling parameter (dynamic stage modeling) of the stage space at the current display time according to the specific stage related parameter in the stage configuration file, that is, obtaining the positions, sizes, orientations, and other information of all display screens in the dynamic stage. In addition, according to the specific stage related parameter of the stage configuration file, the corresponding relationship between the at least one frame image (for example, all frame images) and the stage space may also be obtained. For example, the corresponding relationship between the at least one frame image and the stage space includes the frame image corresponding to each display screen and the corresponding relationship between the source video and the stage space. For example, the corresponding relationship between the source video and the stage space includes the stage plane corresponding to each frame image, the vertex space coordinates of each frame image in a specific stage space (that is, the corresponding stage plane) after each frame image is mapped to the specific stage space, and other information. For example, the stage plane corresponding to each frame image represents the stage plane for displaying the frame image, for example, the frame image is displayed on the stage plane composed of the display screens, of which orientations are upward. For example, the vertex space coordinates may be three-dimensional coordinates, and the vertex space coordinates of a frame image are space coordinates of the vertexes of the frame image in a certain space (for example, the specific stage space).

Because the embodiments of the present disclosure provide a universal method, it is necessary to obtain the specific stage related parameters in advance and store specific stage related parameters in a flexible and extensible storage mode. For example, all display screens are stored in the form of a linked list, so that display screen nodes may be flexibly added in the linked list according to the stage configuration file. When executing the video display method, it may be achieved that the conversion display processing is performed on all display screens only by obtaining a preset pointer pointing to a first display screen node. The video display method may use these preset parameters obtained from the stage configuration file to achieve general processing irrelevant to the stage.

At step S203, according to the stage modeling parameter and the corresponding relationship between the at least one frame image and the stage space, processing the at least one frame image to obtain a plurality of divided regions that are in one-to-one correspondence to all display screens included in the at least one stage plane.

For example, according to the corresponding relationship between the frame image read from the stage configuration file and the stage space, the display screen is unfolded on the corresponding source image plane to obtain the corresponding divided region of each display screen in the source image. It should be noted that the source image in the present disclosure is the frame image corresponding to the display screen.

For example, step S203 may include: for each display screen, determining a spatial position and a size of the display screen at the current display time point according to the stage modeling parameter; according to the corresponding relationship between the at least one source video and the stage space, determining a frame image corresponding to the display screen and a plurality of vertex space coordinates of the frame image in a stage plane corresponding to the frame image after the frame image is mapped to the stage plane corresponding to the frame image; and determining a divided region corresponding to the display screen based on the spatial position and the size of the display screen at the current display time point and the plurality of vertex coordinates of the frame image in the stage plane corresponding to the frame image.

Figure 4:
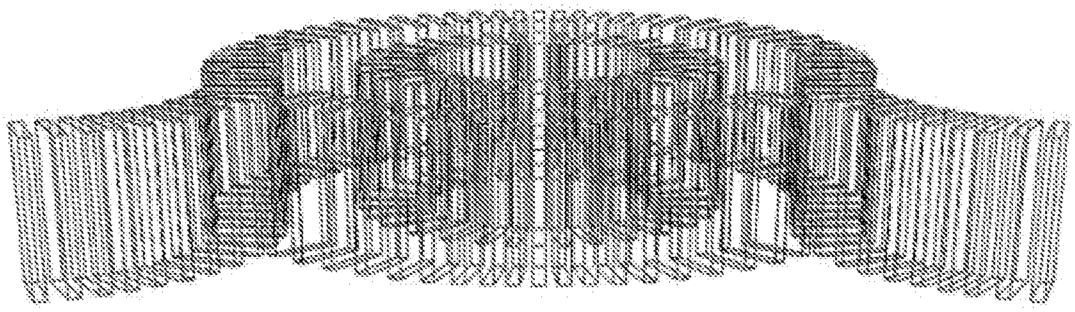
FIG. 4 is a schematic diagram of a third dynamic stage.

The corresponding relationship between the frame image and the stage space includes the frame image corresponding to each display screen. In order to establish the corresponding relationship between the frame image and the display screen of the stage module, after obtaining the spatial position and the size of each display screen, the display screens need to be unfolded on the corresponding source image plane, that is, the display screen and the frame image corresponding to the display screen are set in the same plane, so that coordinate comparison may be carried out, and the plane is called the source image plane. It should be noted that even if a plurality of display screens are installed on the surface of the same stage module, because the orientations of the plurality of display screens are different, the corresponding source images are different. In the dynamic stage shown in FIG. 3, five display screens on the surface of each stage module correspond to five source images, respectively. Therefore, before unfolding, it is necessary to determine the source image to be displayed corresponding to each display screen. This corresponding relationship may be automatically determined by the program. For example, in the dynamic stage as shown in FIG. 3, the corresponding source image to be displayed may be determined by the orientation of each display screen. In some dynamic stages, the user needs to specify the corresponding source image to be displayed. For example, FIG. 4 shows stage modules arranged in a cylindrical shape. There are many cylinders in the whole stage, and each cylinder is composed of the stage modules as shown in FIG. 4. The user may specify that each cylinder displays a specific image. Because the source image corresponding to the display screen is related to the specific stage, and the source image needs to be written into the stage configuration file and read from the stage configuration file through step S202.

The corresponding relationship between the frame image and the stage space also includes the corresponding relationship between the source video and the stage space. For example, the corresponding relationship between the source video and the stage space includes the stage space coordinates corresponding to respective vertexes of each frame image in the source video, and the vertex space coordinates of each frame image in a specific stage space (that is, the stage plane corresponding to the frame image) after each frame image is mapped to the specific stage space. For example, in the dynamic stage as shown in FIG. 3, after projecting display screens facing the same orientation on the corresponding source image plane, the obtained unfolded geometric shape may not be a rectangle. According to a motion range of the display screens, the maximum rectangle that may be formed by the projections of the display screens may be set to correspond to the source image plane, that is, the frame image corresponding to the display screens facing the orientation may be mapped to the maximum rectangle, and the vertex space coordinates of the frame image in the specific stage space after the frame image is mapped to the specific stage space may be determined based on the maximum rectangle. Or, a minimum rectangle containing all the projections of the display screens may be obtained at each specific moment during the movement of the display screens, and the minimum rectangle may be set to correspond to the source image plane, that is, the frame image corresponding to the display screens facing the orientation may be mapped to the minimum rectangle, and the vertex space coordinates of the frame image in the specific stage space after the frame image is mapped to the specific stage space may be determined based on the minimum rectangle. For example, the minimum rectangle may be calculated in real time during the movement of the display screens. Because the geometric shape of the display screens after being unfolded on the source image plane is not a complete rectangle, designers need to consider that the movement of the stage modules may lead to the loss of some contents of the displayed frame image in the design process. In the dynamic stage as shown in FIG. 4, the rectangle obtained by unfolding all the display screens parallel to the cylindrical surface corresponds to the frame image that needs to be displayed on the cylindrical surface, and the effect of wrapping the designed source image on the cylindrical surface may be obtained. After setting the vertex space coordinates corresponding to each frame image mapped to the specific stage space in the stage configuration file, the display screens may be unfolded on the corresponding source image plane, and the coordinates of each display screen may be compared with the vertex space coordinates to obtain the corresponding divided region of each display screen in the source image.

Then, the following operations are cyclically performed on all display screens: dividing the corresponding divided region of the display screen from the corresponding source image; outputting the content of the corresponding divided region to the target memory of the display screen; outputting the content of the target memory to the display controller and then outputting to the display screen.

For example, the above operations may include steps S204-S205 as shown in FIG. 1.

As shown in FIG. 1, in step S204, determining a plurality of display contents that are in one-to-one correspondence to the plurality of divided regions, and copying the plurality of display contents to at least one target memory.

In step S205, outputting a content in the at least one target memory to the at least one stage plane for display.

After the divided region corresponding to each display screen is obtained in step S203, the content to be displayed on each display screen needs to be divided from the source image in steps S204-S205 and transmitted to the display screen for output. Similar to the output way of the display card control display, each LED display screen in the dynamic stage needs to be connected to the display controller through the signal line. The stage technician controls to output the content to be displayed on each display screen to the display controller, and the display screen obtains the content to be output from the display controller through the signal line and outputs the content. Because this step involves the operation on the source memory and the target memory, the method is a universal method irrelevant to the specific stage.

For example, step S204 may include: for each divided region of the plurality of divided regions, determining a source memory address space corresponding to the divided region in the source memory; and arranging contents in the source memory address space according to a display screen pixel arrangement sequence, to obtain a display content corresponding to the divided region.

For example, determining the source memory address space corresponding to the divided region may include: acquiring an offset value of each pixel in the divided region relative to an image origin corresponding to the divided region; determining a source memory address corresponding to the image origin; according to the source memory address corresponding to the image origin and the offset value, determining a source memory address corresponding to each pixel; and according to source memory addresses corresponding to all pixels in the divided region, determining the source memory address space corresponding to the divided region.

It should be noted that, in the embodiments of the present disclosure, the display content corresponding to the divided region indicates the content displayed on the display screen corresponding to the divided region.

Figure 5:
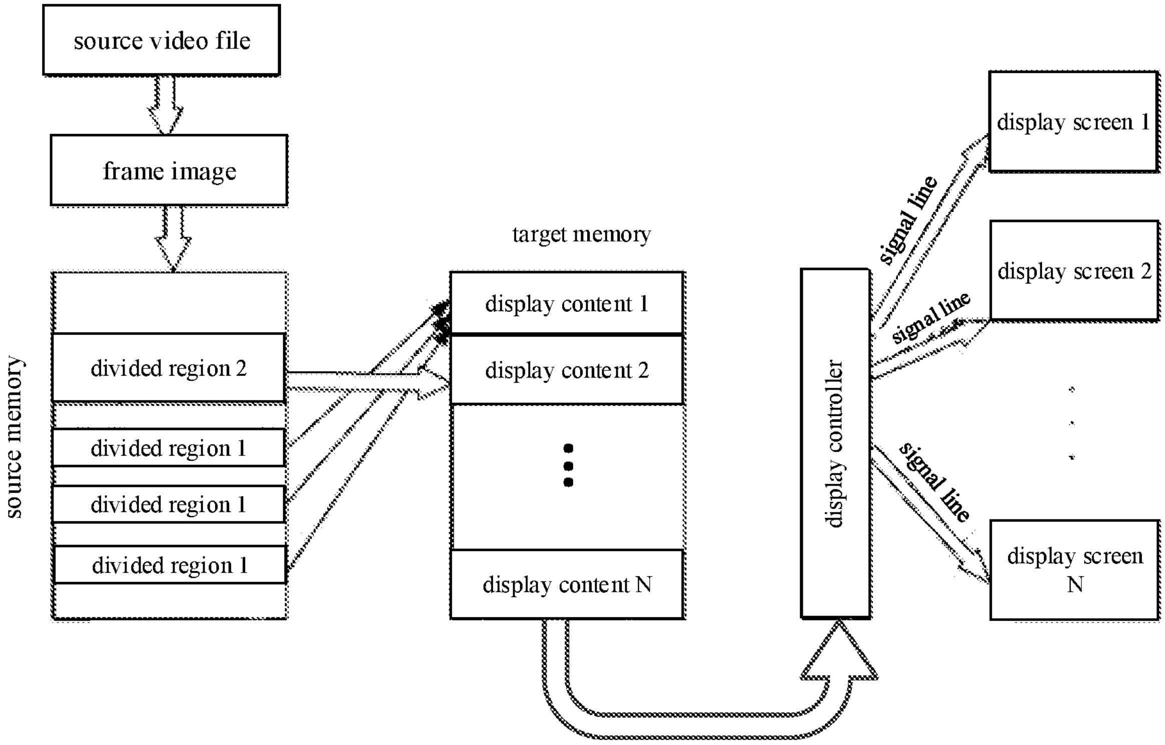
FIG. 5 is a data flow diagram of a video display method according to at least one embodiment of the present disclosure.

FIG. 5 shows a data flow diagram of an exemplary implementation according to an embodiment of the present disclosure.

As shown in FIG. 5, when performing digital display mapping of the dynamic stage, the frame images are first read into the source memory, and the content in the source memory remains unchanged during the whole display processing period. After obtaining the divided region corresponding to each display screen in step S203, the offset value of each pixel in the divided region relative to the image origin corresponding to the divided region may be calculated based on the divided region, so that the source memory address corresponding to the pixel may be obtained. The source memory addresses corresponding to all pixels in the divided region are combined to form the source memory address space corresponding to the divided region.

The source memory address space corresponding to the divided region may be a continuous address space in the source memory, as shown in the divided region 2 in FIG. 5; the source memory address space may also be some discrete address spaces in the source memory, as shown by several divided regions 1 in FIG. 5.

After obtaining the source memory address space of the divided region corresponding to each display screen, it is necessary to copy the contents in the source memory address space to the target memory according to the display screen pixel arrangement sequence, so that the content in the target memory is spatially consistent with the stage display screen. For example, the contents in the source memory address space are arranged according to the display screen pixel arrangement sequence to obtain the corresponding display contents and store the corresponding display contents in the target memory. As shown in FIG. 5, a display content corresponding to the divided region 1 is a display content 1, and a display content corresponding to the divided region 2 is a display content 2. At last, the contents in the target memory (i.e., the display content 1, the display content 2, . . . , the display content N) are output to the display controller for display.

According to an exemplary implementation of the embodiment of the present disclosure, the video display method further comprises the step of performing image editing on the divided region.

For example, step S204 may include: for each divided region of the plurality of divided regions: determining a source memory address space corresponding to the divided region; acquiring an image editing parameter, and performing a transformation process on contents in the source memory address space corresponding to the divided region according to the image editing parameter; and arranging the contents in the source memory address space after being performed the transformation process according to a display screen pixel arrangement sequence, to obtain a display content corresponding to the divided region.

As shown in FIG. 5, in the display process of the display screen, it is often necessary to performing a transformation process on the content of the source memory, that is, the output content of the display screen is not a simple copy of the source image. In this case, it is necessary to perform a transformation process on the display content corresponding to the divided region of the source memory through the processor, the transformation process may be rotation, toning, scaling, and the other image editing. For example, the resolution of the source video may be obtained according to the stage configuration file. If the resolution of the frame image corresponding to the divided region is inconsistent with the resolution of the display screen corresponding to the divided region, the display content, which is copied to the target memory, corresponding to the divided region needs to be scaled, so that the scaled display content corresponding to the divided region is consistent with the resolution of the display screen.

One of the difficulties faced by the dynamic stage for the large-scale performance is the management of the display controller for a large number of display screens. The simplest way is to set up a display controller for each display screen, but it is necessary to set up a management program and process for each display screen separately, for example, allocating a target memory for each display screen, copying the display content obtained according to the divided region corresponding to each display screen to the target memory, outputting the content in the target memory to the display controller for display, and then proceeding with the management process of the next display screen. In this way, the target memory corresponding to the display screen may be recycled after being used up. The target memory occupies a small space, but the system hardware and wiring are complex, and it needs to frequently switch in the control flows of respective display screens, resulting in low efficiency. Another way, as shown in FIG. 5, is to set up a display controller for all display screens, so that the hardware structure and management program of the system are simple, but due to the huge number of display screens involved in the large-scale performance, it is necessary to allocate too large target memory spaces. In addition, when copying the content in the target memory to the display controller, it takes a long time to copy each time because of the large space, which cannot meet the real-time display requirements of the large-scale performance.

According to an exemplary implementation of the embodiment of the present disclosure, all display screens are grouped according to positions of the all display screens, that is, all display screens are divided into at least one display screen group, and the display controllers of the display screens in each display screen group are merged, that is, each display screen group is controlled by a display controller.

For example, a plurality of divided regions corresponding to a plurality of display screens included in each display screen group constitutes a divided region group, and each divided region group corresponds to a target memory of the at least one target memory. In step S101, a target memory is allocated for each display screen group, that is, the target memory corresponds to the divided region group corresponding to the display screen group.

For example, each divided region group corresponds to a display screen arrangement sequence, for example, the display screen arrangement sequence is used to indicate an arrangement sequence of a plurality of display contents corresponding to a plurality of divided regions included in each divided region group in the target memory corresponding to each divided region group. In addition, when step S204 and step S205 are performed cyclically on all display screens, the operations of dividing image and copying memory are executed cyclically taking a display screen group as a unit, and the display contents corresponding to the divided regions corresponding to the display screens in the display screen group are copied to the corresponding target memory according to the display screen arrangement sequence.

For example, copying the plurality of display contents to at least one target memory may include: for an i-th divided region group, according to a display screen arrangement sequence corresponding to the i-th divided region group, copying at least one display content corresponding to at least one divided region included in the i-th divided region group to a target memory corresponding to the i-th divided region group, where i is a positive integer and less than the total number of the at least one divided region group.

In order to solve the management problem of the display controllers of a large number of display screens, according to an exemplary implementation of the embodiment of the present disclosure, a method of grouping the display screens is adopted. In order to facilitate hardware and wiring, the grouping principle is based on the positions of the display screens. Although the display screen changes dynamically during the performance, it generally moves in a local range. The display screens, the positions of which are close, are divided into one group, and the display screens in the same group share a display controller, which brings convenience and conciseness in wiring and simplifies the hardware management of the display controller.

For example, for the plurality of divided regions, taking a divided region group as a unit, sequentially performing operations of determining at least one display content corresponding to at least one divided region included in the divided region group, and copying the at least one display content to a target memory corresponding to the divided region group, and releasing the target memory corresponding to the divided region group in response to a case where a content of the target memory corresponding to the divided region group is output to a corresponding display controller.

That is to say, after the display screens are grouped, each display screen group is taken as the basic unit for allocating the target memory and copying display contents to the display controller, which brings the balance of time and space efficiency. When allocating the space of the target memory, according to the specific hardware resource, the target memories corresponding to five display screen groups may be allocated at the same time. When a certain display screen group is processed, that is, the content in the target memory corresponding to the certain display screen group has been output to the corresponding display controller, the memory occupied by the display screen group is released, and other display screen groups acquire the memory resource for corresponding data processing.

For example, each display screen group also corresponds to a display screen arrangement sequence. When allocating the memory according to the display screen groups, it is necessary to copy the divided regions (the display contents corresponding to the divided regions obtained in step S204) corresponding to display screens in the display screen group to the target memory according to the display screen arrangement sequence, and finally output the stored content in the target memory to the display controller corresponding to the display screen group.

For example, step S205 may include: for each target memory of the at least one target memory: outputting a content in the target memory to a display controller controlling a display screen group corresponding to the target memory; processing the content in the target memory by the display controller according to a display screen arrangement sequence corresponding to the display screen group, to obtain a plurality of display contents stored in the target memory; outputting the plurality of display contents stored in the target memory by the display controller to corresponding display screens in the at least one stage plane for display For example, as shown in FIG. 5, the display controller obtains the content in the target memory, successively extracts the display contents from the content in the target memory according to the display screen arrangement sequence, obtains the display contents to be displayed corresponding to a plurality of display screens controlled by the display controller, and sends the display contents to the corresponding display screens for display through signal lines.

For example, a plurality of display screens are divided into a first display screen group and a second display screen group. P display screens in the first display screen group are controlled by a first display controller, and Q display screens in the second display screen group are controlled by a second display controller. The first display screen group corresponds to the first target memory, the second display screen group corresponds to the second target memory, the first display screen group corresponds to a first display screen arrangement sequence, and the second display screen group corresponds to a second display screen arrangement sequence. When step S205 is executed, the first target memory is output to the first display controller, the first display controller processes the content in the first target memory according to the first display screen arrangement sequence, that is, the content in the first target memory is divided according to the first display screen arrangement sequence to obtain P display contents, and the first display controller sends the P display contents to P display screens through signal lines, respectively. Similarly, when step S205 is executed, the second target memory is output to the second display controller, and the second display controller processes the content in the second target memory according to the second display screen arrangement sequence, i.e., the content in the second target memory is divided according to the second display screen arrangement sequence to obtain Q display contents, and the second display controller respectively sends the Q display contents to the Q display screens through signal lines for display.

According to an exemplary implementation mode of the embodiment of the present disclosure, for a plurality of stages, which are arranged in a plurality of stacked layers, with an shielding relationship, the shielded display screen group does not perform the operation of copying the target memory, and in the process of outputting the content in the target memory to the display controller, the contents in the target memory of the display screen group which is closest to the audience and is not shielded are directly reused.

As shown in FIG. 3, for the three-dimensional dynamic stage of the large-scale performance, the stages are divided into many layers, and there is often a shielding relationship between layers. For the audience, what they can see is only the front display screens, because the rear display screens are shielded, the audience can't see them. However, if the shielded display screen does not contain any display signal, the shielded display screen will become a black screen, and the black screen may be displayed during the movement of the display screen, which will greatly affect the stage background effect.

A better way to deal with the problem is that the rear display screen reuses the display information of the front display screen, so as to obtain the best stage background effect. In the display process of the display screen, the consumption of space and time resources is mainly reflected in allocating the target memory for the display screen, determining the display content of the display screen according to the divided region, and writing the display content into the target memory. It should be noted that, in the present disclosure, "front display screen" means a display screen that is not shielded and is closer to the audience, that is, the audience can see the complete information displayed on the display screen; "rear display screen" means a display screen that is at least partially shielded, that is, the audience cannot see the complete information displayed on the display screen.

According to an exemplary implementation mode of the embodiment of the disclosure, when the display information of the front display screen is reused by the rear display screen, the operation of copying the content in the target memory is not performed; in the process of outputting the content in the target memory to the display controller, the display contents in the target memory corresponding to the display screen group which is at the front most position and not shielded are directly reused. In this way, while setting appropriate display information for the rear display screen, the time and space resources of the system are greatly saved.

According to an exemplary implementation of the embodiment of the present disclosure, the output sequence of the display screen groups is arranged, so that the plurality of stages, which are arranged in a plurality of stacked layers, with an shielding relationship are output from front to rear in the direction from closest to the audience to away from the audience, where "front" refers to the display screen group closest to the audience. In addition, a common target memory is allocated for each display screen group. When the steps S204-S205 are cyclically executed on all display screens, firstly, it is judged whether the display screen group is shielded, and if the display screen group is shielded, the existing content in the common target memory space is directly reused.

For example, at least one target memory includes a common target memory, and at least one divided region group corresponding to at least one display screen group shares the common target memory. According to the output sequence of the display screen groups, the at least one divided region group sequentially obtains the modification authority to the common target memory, and when a divided region group obtains the modification authority, the divided region group can modify the content in the common target memory.

For example, step S204 may include: for an i-th divided region group, according to m spatial positions of m display screens corresponding to m divided regions included in the i-th divided region group, determining whether the m display screens are all shielded, in response to a case where the m display screens all are shielded, taking a content currently stored in the common target memory as m display contents corresponding to the m divided regions, and not executing a writing operation to the common target memory; in response to a case where at least one display screen of the m display screens is not shielded, determining m display contents corresponding to the m divided regions, and writing the m display contents into the common target memory, where i is a positive integer and less than the total number of the at least one divided region group, and m is a positive integer.

For the display screens with a shielding relationship, the display information of the front display screen may be reused by the rear display screen, which can improve the display efficiency. Therefore, in order to improve the overall display efficiency of the dynamic stage, according to an exemplary implementation mode of the embodiment of the present disclosure, the output sequence of the display screen groups is arranged, so that the plurality of stages, which are arranged in a plurality of stacked layers, with an shielding relationship are output from front to rear, and the corresponding display screen groups are allocated with the common target memory. In the steps S204-S205, firstly, it is judged whether the display screen group is shielded, and the existing content in the common target memory is directly reused for the shielded display screen group.

Before the display content of the display screen is output, the output sequence of the display screen groups is arranged in advance, so that all the shielded display screen groups may reuse the display information of the front display screen group. For example, the output sequence of the display screen groups is set such that the step S204 is first performed for the display screen group closest to the audience, so that when the display screen group away from the audience is shielded, the display screen group may directly reuse the existing content in the common target memory, thus further improving the display efficiency. Because there are many shielding situations in the dynamic stage of the large-scale performance, this method can greatly improve the digital display efficiency of the stage.

For example, in one example, at least one display screen group includes a first display screen group and a second display screen group, the first display screen group and the second display screen group share a common target memory. The first display screen group is located on the side of the second display screen group close to the audience, the second display screen group is completely shielded by the first display screen group, and the first display screen group isn't shielded by any display screen group. In this case, firstly, it is judged whether the display screens included in the first display screen group are all shielded, and because the display screens included in the first display screen group are not shielded, the display contents corresponding to the divided regions in the divided region group corresponding to the first display screen group are written into the common target memory; after that, it is judged whether the display screens included in the second display screen group are all shielded. Because the second display screen group is completely shielded by the first display screen group, the contents currently stored in the common target memory, that is, the display contents corresponding to the first display screen group, are taken as the display contents corresponding to the divided regions in the divided region group corresponding to the second display screen group, and the writing operation to the common target memory is not performed, that is, the contents in the common target memory are not modified.

In an ideal situation, at each display time point, the frame image is converted and output to the display screen in real time, so that the dynamic video background may be seen on the display screens of the dynamic stage. However, in practice, because the dynamic stage of the large-scale performance involves hundreds or thousands of high-resolution display screens, and the video files are huge, it takes a long time to convert, copy, and output each frame image. Therefore, if the frame image is converted and output at each specific display time point, the frame rate required for video output cannot be achieved, that is, the effect of real-time video background display cannot be achieved.

According to an exemplary implementation mode of the embodiment of the disclosure, the content in the target memory at each display time point is added to the stage screen control video file. When the background video of the stage space needs to be displayed, the stage screen control video file containing the contents at all display time points is outputted to the display controller. That is to say, the conversion and storage of the source video is completed before the performance, and the processed stage screen control video file is directly output to the display controller when the performance is going on, so that the video background display effect of the dynamic stage for the large-scale performance may be achieved.

For example, step S205 may include: for each display screen group, storing a content in a target memory corresponding to the display screen group, to generate a stage screen control video file corresponding to the display screen group; in response to displaying the background video, outputting at least one stage screen control video file corresponding to the at least one display screen group to the at least one display controller for display.

Here, the stage screen control video file corresponding to the display screen group includes the content in the target memory corresponding to each of the plurality of display time points, and the contents in the target memory corresponding to the plurality of display points are sequentially stored in the stage screen control video file corresponding to the display screen group according to the time relationship.

Of course, the stage screen control video file may correspond to a display screen and only contain the display content displayed on the display screen, that is, the display screen group includes a display screen in this case. In this case, the stage screen control video file includes the contents in the target memory corresponding to the display screen at the plurality of display time points, and the contents in the target memory corresponding to the display screen at the plurality of display time points are stored according to the time sequence of the display time points, thereby generating the stage screen control video file corresponding to the display screen.

When converting source video files into stage screen control video files, the most important thing is to keep the time relationship and spatial relationship between the stage screen control video files and the display screens consistent: the consistent time relationship means that each stage screen control video file is composed of display contents corresponding to different display time points and being arranged in sequence, that is, the contents in the target memory corresponding to different display time points are arranged according to the time sequence of the display time points. The consistent spatial relationship means that each stage screen control video file corresponds to the specific display screen in the stage space, and only contains the display contents displayed in the corresponding display screen group, that is, the display contents in the stage screen control video file are arranged according to the display screen arrangement sequence corresponding to the display screen group. The stage screen control video file is completely different from the source video. It will be trivial and confusing if the stage screen control video file is played directly on the ordinary computer, but if the stage screen control video file is output to the display controllers of the dynamic stage, the output of the display screen may be controlled correctly, and the combination of the display screens can display the correct video background.

Figure 6:
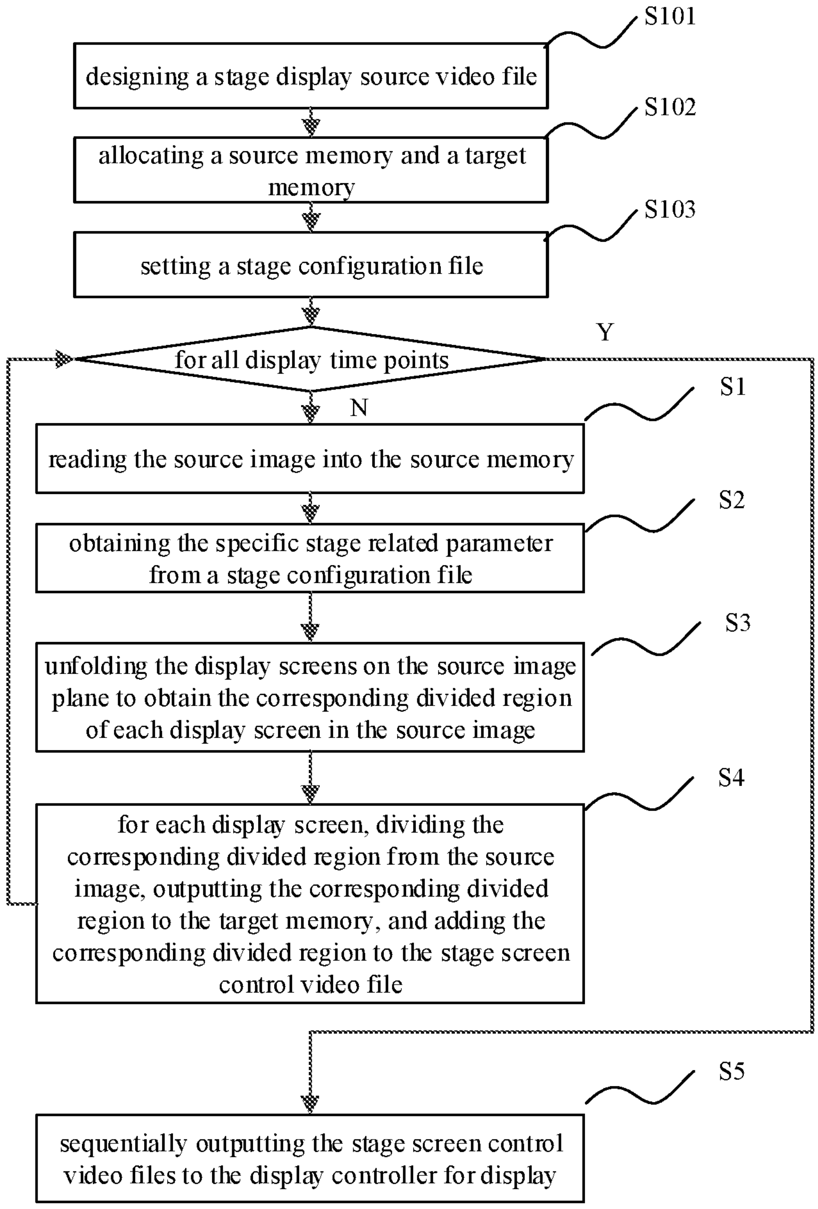
FIG. 6 is a flowchart of a video display method according to another embodiment of the present disclosure.

FIG. 6 is a flowchart of a video display method according to another embodiment of the present disclosure.

As shown in FIG. 6, the video display method includes steps S101-S103, and with respect to steps S101-S103, reference may be made to the above contents, which will not be repeated here.

Thereafter, the display time interval of the display screen is set, and the following operations are performed for each display time point, that is, steps S1-S5 are performed.

In step S1, reading the source image into the source memory, that is, all frame images corresponding to the current display time point in the source video are acquired, and these frame images are read into the source memory.

In step S2, obtaining the specific stage related parameter from a stage configuration file.

For example, reading the stage configuration file, and according to the parameter in the stage configuration file, obtaining the dynamic stage modeling at the time point and the corresponding relationship between each frame image and the stage space. For details, please refer to the description of step S202, which will not be repeated here.

In step S3, unfolding the display screens on the source image plane to obtain the corresponding divided region of each display screen in the source image. For details, please refer to the description in step S203, which will not be repeated here.

In step S4, for each display screen, dividing the corresponding divided region (i.e., the display content corresponding to the divided region) from the source image, outputting the corresponding divided region to the target memory, and adding the corresponding divided region to the stage screen control video file.

For example, the process of outputting the corresponding divided region to the target memory may refer to the description of step S204, which will not be repeated here.

For example, in this case, instead of outputting the content in the target memory to the display controller for display in real time, the contents in the target memory corresponding to the display screen at a plurality of display time points are written into the stage screen control video file corresponding to the display screen.

In step S5, sequentially outputting the stage screen control video files to the display controller for display.

For example, each display screen corresponds to a stage screen control video file, and a plurality of stage screen control video files corresponding to a plurality of display screens are output to corresponding display controllers according to the spatial relationship of the display screens, and the display controllers sequentially output display contents to the display screens according to the time relationship, so as to display the background video.

On the other hand, the present disclosure also provides a video display system for a general large-scale performance dynamic stage. The video display system is used for displaying a background video in a stage space. Here, the stage space includes at least one stage plane, each stage plane includes a plurality of display screens, the background video includes at least one source video, each source video includes a plurality of frame images corresponding to a plurality of display time points, respectively, and each source video is displayed on a stage plane, the related contents will not be described again.

Figure 7:
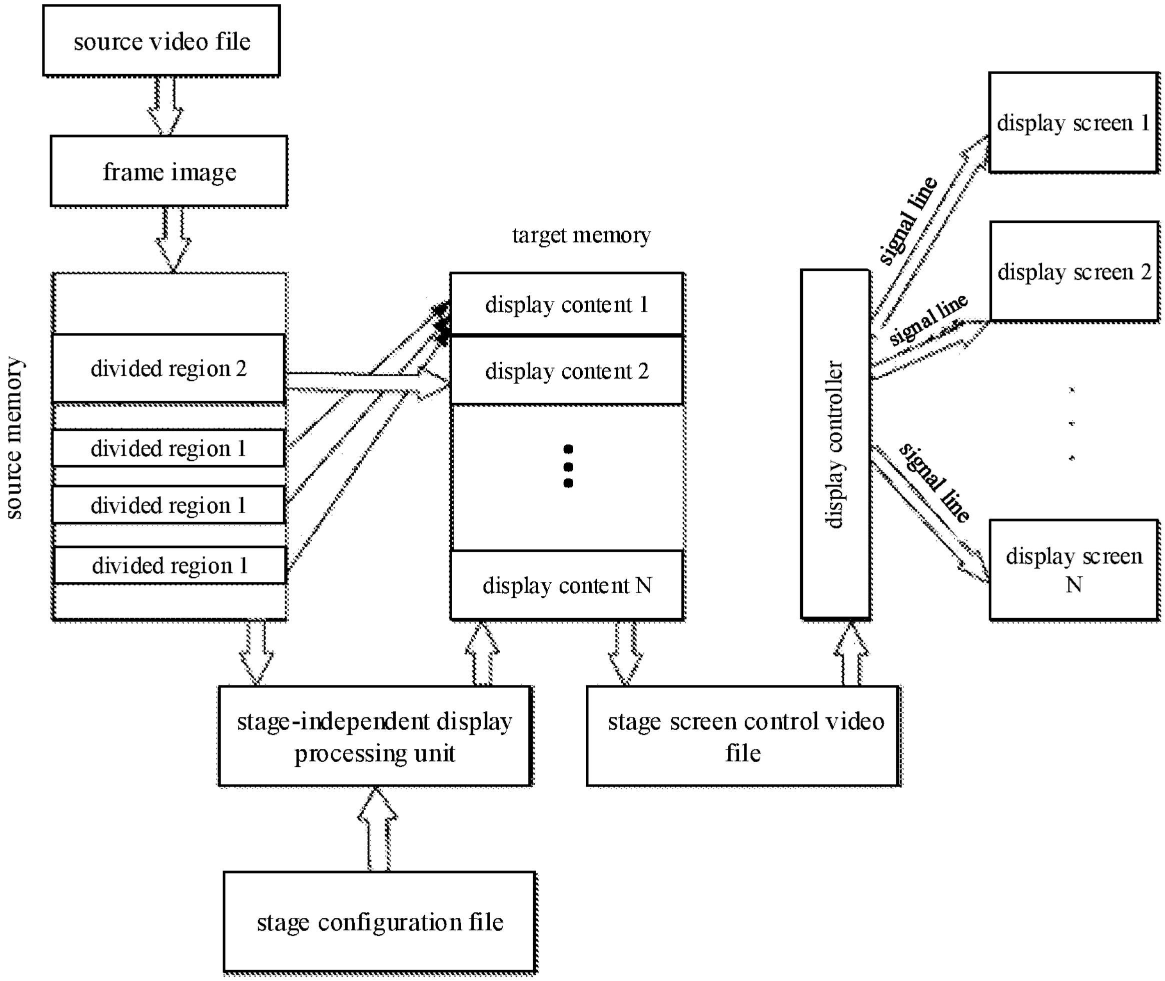
FIG. 7 is a structural diagram of a video display system according to an embodiment of the present disclosure.

FIG. 7 is a structural diagram of a video display system according to an embodiment of the present disclosure.

The video display system comprises a stage-independent display processing unit, a source memory, at least one target memory, at least one display controller, dynamic stage modules with display screens, and the like. The video display system also includes a stage configuration file, a source video file, etc. The video display system obtains specific stage related parameters through the stage configuration file and displays the source video file in the stage space.

The source memory is used to store the frame image of the source video file as the stage background, that is, at least one frame image, which corresponds to the current display time point, in at least one source video file.

The target memory is used to store the target frame image corresponding to the display signal of the display screen.

The stage configuration file is used to store the specific stage related parameter.

The stage-independent display processing unit is used to perform the following stage-independent general operations: reading the stage configuration file, and obtaining the dynamic stage modeling at the corresponding display time point of each frame image (that is, the stage modeling parameter of the stage space at the current display time point) and the corresponding relationship between each frame image and the stage space according to the specific stage related parameter(s) in the stage configuration file; unfolding the display screens on the corresponding source image plane, and obtaining the corresponding divided region of each display screen in the source image (that is, the frame image corresponding to the display screen) according to the corresponding relationship between the frame image and the stage space read from the stage configuration file; for each display screen, obtaining the source memory address space corresponding to the divided region that corresponds to the display screen, arranging the contents in the source memory address space according to the display screen pixel arrangement sequence to obtain the display content displayed on the display screen, and copying the display content to the target memory; and outputting the content in the target memory to at least one stage plane for display.

The display controller is used for acquiring the display content displayed on the display screen and controlling the display screen to output (i.e., display) the display content through the signal line.

When real-time display is not needed, the video display system may also include a plurality of stage screen control video files corresponding to a plurality of display screen groups. Each stage screen control video file is used to store each target frame image according to the time relationship (that is, the time sequence among the display time points) and the spatial relationship (that is, the display screen arrangement sequence corresponding to each display screen group) of the display screens, and is used for the input of the display controller. After that, when the display controller displays the background video, that is, the source video, the display controller controls the display of the background video according to the stage screen control video file.

FIG. 7 shows the system structure of this embodiment. From FIG. 7, it may be seen that the stage-independent display processing unit is the core component of the system provided by this embodiment. This stage-independent display processing unit converts the content in the source memory and the target memory, and implements the stage-independent display processing process through preset interface parameters (that is, specific stage related parameters in the stage configuration file).

In addition, the content of the target memory is first stored in the stage screen control video file, and when displaying, the display controller displays according to the content of the stage screen control video file.

Accordingly, when the content in the target memory is displayed in real time (not shown), the content in the target memory is directly output to the display controller for display, and there is no need to generate a stage screen control video file at this time.

On the other hand, the present disclosure also provides an electronic device, the electronic device includes: at least one processor; and a memory communicatively connected with the at least one processor. The memory stores instructions that may be executed by the at least one processor, and the instructions are executed by the at least one processor, to make the at least one processor to execute the video display method for a general large-scale performance dynamic stage described above.

On the other hand, the present disclosure also provides a non-transitory computer-readable storage medium, the non-transitory computer-readable storage medium stores computer instructions, and the computer instructions are executed by a computer to make the computer execute the video display method described above.

On the other hand, the present disclosure also provides a computer program product, the computer program product comprises a computer program stored on a non-transitory computer-readable storage medium, the computer program comprises program instructions, when the program instructions are executed by a computer, the computer is caused to execute the video display method described above.

The flowcharts and block diagrams in the drawings illustrate the possible implementation architectures, functions, and operations of the systems, methods, and computer program products according to various embodiments of the present disclosure. In this regard, each block in the flowchart or block diagram may represent a module, a program segment, or a part of code, the module, the program segment, or the part of code contains one or more executable instructions for implementing specified logical functions. It should also be noted that in some alternative implementations, the functions noted in the blocks may also occur in a different order from those noted in the drawings. For example, two blocks shown in succession may actually be executed in substantially parallel, or may sometimes be executed in a reverse order, depending on the functions involved. It should also be noted that each block in the block diagrams and/or flowcharts and combinations of blocks in the block diagrams and/or flowcharts may be implemented by a dedicated hardware-based system that perform specified functions or operations, or may be implemented by a combination of dedicated hardware and computer instructions.

The units described in the embodiments of the present disclosure may be implemented by software or hardware. Among them, the name of the unit does not constitute the limitation on the unit itself.

It should be understood that each part of the present disclosure may be implemented by hardware, software, firmware, or a combination thereof.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

What is claimed is:

1. A video display method, for displaying a background video of a stage space, wherein the stage space comprises at least one stage plane, each of the at least one stage plane comprises a plurality of display screens, the background video comprises at least one source video, each source video comprises a plurality of frame images corresponding to a plurality of display time points, respectively, and each source video is displayed on a stage plane, the video display method, for a current display time point of the plurality of display time points, comprises:

acquiring at least one frame image corresponding to the current display time point in the at least one source video;

reading a stage configuration file, and obtaining a stage modeling parameter of the stage space at the current display time point and a corresponding relationship between the at least one frame image and the stage space according to a specific stage related parameter in the stage configuration file;

according to the stage modeling parameter and the corresponding relationship between the at least one frame image and the stage space, processing the at least one frame image to obtain a plurality of divided regions that are in one-to-one correspondence to all display screens comprised in the at least one stage plane;

determining a plurality of display contents that are in one-to-one correspondence to the plurality of divided regions, and copying the plurality of display contents to at least one target memory; and outputting a content in the at least one target memory to the at least one stage plane for display;

wherein the all display screens are divided into at least one display screen group according to positions of the all display screens, at least one divided region corresponding to at least one display screen comprised in each display screen group constitutes a divided region group, and each divided region group corresponds to a target memory of the at least one target memory, each divided region group corresponds to a display screen arrangement sequence, wherein the display screen arrangement sequence is used for indicating an arrangement sequence of at least one display content corresponding to the at least one divided region comprised in each divided region group in a target memory corresponding to each divided region group, copying the plurality of display contents to at least one target memory, comprises:

for an i-th divided region group, according to a display screen arrangement sequence corresponding to the i-th divided region group, copying at least one display content corresponding to at least one divided region comprised in the i-th divided region group to a target memory corresponding to the i-th divided region group, wherein i is a positive integer and less than a total number of the at least one divided region group.

2. The video display method according to claim 1, wherein a spatial position and a size of each display screen at the current display time point are obtained based on the stage modeling parameter, the corresponding relationship between the at least one frame image and the stage space comprises a frame image corresponding to each display screen and a corresponding relationship between the at least one source video and the stage space, the corresponding relationship between the at least one source video and the stage space comprises a stage plane corresponding to each of the at least one frame image and a plurality of vertex space coordinates of each frame image in a stage plane corresponding to each frame image after each frame image is mapped to the stage plane corresponding to each frame image, according to the stage modeling parameter and the corresponding relationship between the at least one frame image and the stage space, processing the at least one frame image to obtain the plurality of divided regions that are in one-to-one correspondence to the all display screens comprised in the at least one stage plane, comprises:

for each display screen of the all display screens, determining a spatial position and a size of the display screen at the current display time point according to the stage modeling parameter;

according to the corresponding relationship between the at least one source video and the stage space, determining a frame image corresponding to the display screen and a plurality of vertex space coordinates of the frame image in a stage plane corresponding to the frame image after the frame image is mapped to the stage plane corresponding to the frame image; and determining a divided region corresponding to the display screen based on the spatial position and the size of the display screen at the current display time point and the plurality of vertex coordinates of the frame image in the stage plane corresponding to the frame image.

3. The video display method according to claim 1, wherein before determining the plurality of display contents that are in one-to-one correspondence to the plurality of divided regions, the video display method further comprises:

reading the at least one frame image into a source memory.

4. The video display method according to claim 3, wherein determining the plurality of display contents that are in one-to-one correspondence to the plurality of divided regions, comprises:

for each divided region of the plurality of divided regions, determining a source memory address space corresponding to the divided region in the source memory; and arranging contents in the source memory address space according to a display screen pixel arrangement sequence, to obtain a display content corresponding to the divided region.

5. The video display method according to claim 4, wherein determining the source memory address space corresponding to the divided region in the source memory, comprises:

acquiring an offset value of each pixel in the divided region relative to an image origin corresponding to the divided region;

determining a source memory address corresponding to the image origin;

according to the source memory address corresponding to the image origin and the offset value, determining a source memory address corresponding to each pixel; and according to source memory addresses corresponding to all pixels in the divided region, determining the source memory address space corresponding to the divided region.

6. The video display method according to claim 3, wherein determining the plurality of display contents that are in one-to-one correspondence to the plurality of divided regions, for each divided region of the plurality of divided regions, comprises:

determining a source memory address space corresponding to the divided region;

acquiring an image editing parameter, and performing a transformation process on contents in the source memory address space corresponding to the divided region according to the image editing parameter; and arranging the contents in the source memory address space after being performed the transformation process according to a display screen pixel arrangement sequence, to obtain a display content corresponding to the divided region.

7. The video display method according to claim 1, wherein each display screen group is controlled by a display controller, and the video display method further comprises:

for the plurality of divided regions, taking a divided region group as a unit, sequentially performing operations of determining at least one display content corresponding to at least one divided region comprised in the divided region group, and copying the at least one display content to a target memory corresponding to the divided region group, and releasing the target memory corresponding to the divided region group in response to a case where a content of the target memory corresponding to the divided region group is output to a corresponding display controller.

8. The video display method according to claim 1, wherein the at least one target memory comprises a common target memory, and at least one divided region group corresponding to the at least one display screen group shares the common target memory, determining the plurality of display contents that are in one-to-one correspondence to the plurality of divided regions, and copying the plurality of display contents to at least one target memory, comprises:

for an i-th divided region group, according to m spatial positions of m display screens corresponding to m divided regions comprised in the i-th divided region group, determining whether the m display screens are all shielded, in response to a case where the m display screens are all shielded, taking a content currently stored in the common target memory as m display contents corresponding to the m divided regions, and not executing a writing operation to the common target memory;

in response to a case where at least one display screen of the m display screens is not shielded, determining m display contents corresponding to the m divided regions, and writing the m display contents into the common target memory, wherein i is a positive integer and less than a total number of the at least one divided region group, and m is a positive integer.

9. The video display method according to claim 1, wherein each display screen group is controlled by a display controller, and each display screen group corresponds to a target memory and a display screen arrangement sequence, outputting the content in the at least one target memory to the at least one stage plane for display, comprises:

for each target memory of the at least one target memory:

outputting a content in the target memory to a display controller controlling a display screen group corresponding to the target memory;

processing the content in the target memory by the display controller according to a display screen arrangement sequence corresponding to the display screen group, to obtain a plurality of display contents stored in the target memory;

outputting the plurality of display contents stored in the target memory by the display controller to corresponding display screens in the at least one stage plane for display.

10. The video display method according to claim 1, wherein each display screen group is controlled by a display controller, each display screen group corresponds to a target memory and a display screen arrangement sequence, each display screen group corresponds to a stage screen control video file, outputting the content in the at least one target memory to the at least one stage plane for display, comprises:

for each display screen group of the at least one display screen group, storing a content in a target memory corresponding to the display screen group, to generate a stage screen control video file corresponding to the display screen group;

in response to displaying the background video, outputting at least one stage screen control video file corresponding to the at least one display screen group to the at least one display controller for display.

11. The video display method according to claim 10, wherein the stage screen control video file corresponding to the display screen group comprises a content in a target memory corresponding to each of the plurality of display time points, and contents in the target memory corresponding to the plurality of display time points are sequentially stored in the stage screen control video file corresponding to the display screen group according to a time relationship.

12. A non-transitory computer-readable storage medium, wherein the non-transitory computer-readable storage medium stores computer instructions, and the computer instructions are used for making a computer execute the video display method according to claim 1.

13. A video display system, for displaying a background video of a stage space, wherein the stage space comprises at least one stage plane, each of the at least one stage plane comprises a plurality of display screens, the background video comprises at least one source video, each source video comprises a plurality of frame images corresponding to a plurality of display time points, respectively, and each source video is displayed on a stage plane, the video display system comprises a stage-independent display processing unit, a source memory, at least one target memory, and at least one display controller, the source memory is configured to store at least one frame image, which corresponds to a current display time point of the plurality of display time points, in the at least one source video;

the stage-independent display processing unit is configured to:

reading a stage configuration file, and obtaining a stage modeling parameter of the stage space at the current display time point and a corresponding relationship between the at least one frame image and the stage space according to a specific stage related parameter in the stage configuration file, according to the stage modeling parameter and the corresponding relationship between the at least one frame image and the stage space, processing the at least one frame image to obtain a plurality of divided regions that are in one-to-one correspondence to all display screens comprised in the at least one stage plane, determining a plurality of display contents that are in one-to-one correspondence to the plurality of divided regions, and copying the plurality of display contents to at least one target memory, outputting a content of the at least one target memory to the at least one stage plane for display;

the at least one target memory is configured to store display contents of the all display screens, the at least one display controller is configured to control a corresponding display screen to display a display content to be displayed through a signal line according to the content in the at least one target memory;

wherein the all display screens are divided into at least one display screen group according to positions of the all display screens, at least one divided region corresponding to at least one display screen comprised in each display screen group constitutes a divided region group, and each divided region group corresponds to a target memory of the at least one target memory, each divided region group corresponds to a display screen arrangement sequence, wherein the display screen arrangement sequence is used for indicating an arrangement sequence of at least one display content corresponding to the at least one divided region comprised in each divided region group in a target memory corresponding to each divided region group, copying the plurality of display contents to at least one target memory, comprises:

for an i-th divided region group, according to a display screen arrangement sequence corresponding to the i-th divided region group, copying at least one display content corresponding to at least one divided region comprised in the i-th divided region group to a target memory corresponding to the i-th divided region group, wherein i is a positive integer and less than a total number of the at least one divided region group.

14. The video display system according to claim 13, wherein the all display screens are divided into at least one display screen group according to positions of the all display screens, each display screen group is controlled by a display controller, and each display screen group corresponds to a target memory and a display screen arrangement sequence, each display screen group corresponds to a stage screen control video file, in a case where the stage-independent display processing unit performs an operation of outputting the content in the at least one target memory to the at least one stage plane for display, the operation comprises following steps:

for each display screen group of the at least one display screen group, storing a content in a target memory corresponding to the display screen group, to generate a stage screen control video file corresponding to the display screen group, wherein the stage screen control video file corresponding to the display screen group comprises a content in a target memory corresponding to each of the plurality of display time points, and contents in the target memory corresponding to the plurality of display time points are sequentially stored in the stage screen control video file corresponding to the display screen group according to a time relationship;

in response to displaying the background video, outputting at least one stage screen control video file corresponding to the at least one display screen group to the at least one display controller for display.

15. An electronic device, comprising:

at least one processor; and a memory communicatively connected with the at least one processor;

wherein the memory stores instructions executable by the at least one processor, and the instructions are executed by the at least one processor to make the at least one processor to execute a video display method, the video display method is used for displaying a background video of a stage space, the stage space comprises at least one stage plane, each of the at least one stage plane comprises a plurality of display screens, the background video comprises at least one source video, each source video comprises a plurality of frame images corresponding to a plurality of display time points, respectively, and each source video is displayed on a stage plane, the video display method, for a current display time point of the plurality of display time points, comprises:

acquiring at least one frame image corresponding to the current display time point in the at least one source video;

reading a stage configuration file, and obtaining a stage modeling parameter of the stage space at the current display time point and a corresponding relationship between the at least one frame image and the stage space according to a specific stage related parameter in the stage configuration file;

according to the stage modeling parameter and the corresponding relationship between the at least one frame image and the stage space, processing the at least one frame image to obtain a plurality of divided regions that are in one-to-one correspondence to all display screens comprised in the at least one stage plane;

determining a plurality of display contents that are in one-to-one correspondence to the plurality of divided regions, and copying the plurality of display contents to at least one target memory; and outputting a content in the at least one target memory to the at least one stage plane for display;

wherein the all display screens are divided into at least one display screen group according to positions of the all display screens, at least one divided region corresponding to at least one display screen comprised in each display screen group constitutes a divided region group, and each divided region group corresponds to a target memory of the at least one target memory, each divided region group corresponds to a display screen arrangement sequence, wherein the display screen arrangement sequence is used for indicating an arrangement sequence of at least one display content corresponding to the at least one divided region comprised in each divided region group in a target memory corresponding to each divided region group, copying the plurality of display contents to at least one target memory, comprises:

for an i-th divided region group, according to a display screen arrangement sequence corresponding to the i-th divided region group, copying at least one display content corresponding to at least one divided region comprised in the i-th divided region group to a target memory corresponding to the i-th divided region group, wherein i is a positive integer and less than a total number of the at least one divided region group.

* * * * *